United States Patent
Ahn et al.

(10) Patent No.: US 7,672,339 B2
(45) Date of Patent: Mar. 2, 2010

(54) METHOD OF RESOLVING OVERLAPS IN DATA TRANSMISSION AND USER EQUIPMENT THEREFOR

(75) Inventors: Joon Kui Ahn, Anyang-si (KR); Ki Jun Kim, Anyang-si (KR); Bin Chul Ihm, Anyang-si (KR); Young Woo Yun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/350,985

(22) Filed: Jan. 9, 2009

(65) Prior Publication Data
US 2009/0201951 A1    Aug. 13, 2009

(30) Foreign Application Priority Data
Jan. 11, 2008    (KR) .................. 10-2008-0003517

(51) Int. Cl.
H04J 3/06        (2006.01)
(52) U.S. Cl. .................................. 370/503
(58) Field of Classification Search ......... 370/503–520, 370/445, 447, 465
See application file for complete search history.

(56) References Cited

U.S. PATENT DOCUMENTS

| | | | |
|---|---|---|---|
| 5,243,626 A * | 9/1993 | Devon et al. ................. | 375/239 |
| 5,568,482 A * | 10/1996 | Li et al. ........................ | 370/471 |
| 5,828,660 A * | 10/1998 | Baum et al. .................. | 370/330 |
| 7,554,985 B2 * | 6/2009 | Ihm et al. ..................... | 370/394 |
| 2002/0028689 A1 * | 3/2002 | Iwami et al. ................. | 455/502 |
| 2003/0026215 A1 * | 2/2003 | Schafer ....................... | 370/280 |
| 2004/0095170 A1 * | 5/2004 | Sugimoto et al. ........... | 327/141 |
| 2004/0264431 A1 | 12/2004 | Rhodes | |
| 2006/0087961 A1 | 4/2006 | Chang et al. | |
| 2006/0153147 A1 * | 7/2006 | Chillariga et al. ........... | 370/337 |
| 2006/0291499 A1 * | 12/2006 | Stanwood .................... | 370/447 |
| 2007/0129085 A1 * | 6/2007 | Kennedy Jr. .............. | 455/456.2 |
| 2007/0263582 A1 * | 11/2007 | Yuasa .......................... | 370/338 |
| 2007/0293157 A1 * | 12/2007 | Haartsen et al. .......... | 455/67.11 |
| 2008/0013500 A1 * | 1/2008 | Laroia et al. ................. | 370/338 |
| 2008/0095254 A1 * | 4/2008 | Muharemovic et al. ..... | 375/260 |
| 2008/0304551 A1 * | 12/2008 | Li et al. ....................... | 375/140 |
| 2009/0010180 A1 * | 1/2009 | Xue et al. .................... | 370/254 |
| 2009/0122731 A1 * | 5/2009 | Montojo et al. ............. | 370/280 |
| 2009/0129367 A1 * | 5/2009 | Bitran ........................ | 370/350 |

FOREIGN PATENT DOCUMENTS

| | | |
|---|---|---|
| JP | 2000-244441 A | 9/2000 |
| KR | 10-2006-0008576 A | 1/2006 |
| KR | 10-2006-0035939 A | 4/2006 |

\* cited by examiner

*Primary Examiner*—Kwang B Yao
*Assistant Examiner*—Kenan Cehic
(74) *Attorney, Agent, or Firm*—Birch, Stewart, Kolasch & Birch, LLP

(57) ABSTRACT

A method of adjusting transmission timing, a method of continuously transmitting packets, and a mobile station are provided. The method of adjusting the transmission timing includes adjusting the transmission timing according to a transmission timing adjustment command when the transmission timing adjustment command is received from a receiving side; and creating a cyclic prefix (CP) in consideration of a part of a CP of a next symbol which overlaps with a previous symbol on a time axis on the basis of the adjusted transmission timing. Accordingly, it is possible to prevent deterioration in reception performance and minimize reception complexity even when packet transmission timing is adjusted at a transmitting side using an OFDMA or analogous radio access scheme.

16 Claims, 5 Drawing Sheets

SUBFRAME
START TIMING

COLLISION PART

TIME

OFDM SYMBOL DEMODULATION PART

NOT TRANSMITTED

COLLISION PART

TIME

METHOD OF RESOLVING OVERLAPS IN DATA TRANSMISSION AND USER EQUIPMENT THEREFOR

TECHNICAL FIELD

The present invention relates to an orthogonal frequency division multiple access (OFDMA) and analogous radio access scheme, and more particularly, to a method of adjusting transmission timing at a transmitting side, a method of transmitting continuous packets, and a mobile station thereof.

BACKGROUND ART

In the basic principle of orthogonal frequency division multiplexing (OFDM), a data stream having a high rate is divided into a large number of data streams having a slow rate and the data streams are simultaneously transmitted using a plurality of carriers. Each of the plurality of carriers is called a sub-carrier. Since orthogonality exists among the plurality of carriers in the OFDM, the carriers can be detected by a receiving side although frequency components of the carriers overlap with each other. The data stream having the high rate is converted into a plurality of data streams having the slow rate by a serial-to-parallel converter, each of the plurality of data streams converted in parallel is multiplied by each of the sub-carriers, the data streams are added, and the added data streams are transmitted to the receiving side.

The plurality of parallel data streams generated by the serial-to-parallel converter may be transmitted by the plurality of sub-carriers using an Inverse Discrete Fourier Transform (IDFT), and the IDFT may be efficiently implemented using an Inverse Fast Fourier Transform (IFFT).

Since a symbol duration of each of the sub-carriers having the slow rate is increased, a relative signal dispersion on a time axis, which is generated by multi-path delay spread, is decreased. Inter-symbol interference can be reduced by inserting a guard interval longer than the delay spread of a channel between OFDM symbols. In addition, when a part of an OFDM signal is copied and arranged at a start part of a symbol in a guard interval, OFDM symbols are cyclically extended such that the symbols are protected.

Meanwhile, OFDMA is a multiple access method which provides a part of available sub-carriers to each user in a system using OFDM modulation method so as to realize multiple access. In the OFDM, each of frequency resources called sub-carriers is provided to each user. That is, the frequency resources are independently provided to the plurality of users so as not to overlap with each other. As a result, the frequency resources are exclusively allocated.

FIG. 1 is a view showing the structure of a transmitting side using a single carrier-frequency division multiple access (SC-FDMA) scheme.

The SC-FDMA (IFDMA or DFTs-OFDMA) scheme which is a modified example of the OFDMA may be considered for uplink wideband transmission. In the SC-FDMA scheme, discrete Fourier Transform (DFT) coding is performed with respect to symbols before OFDMA modulation and multiplexing. Accordingly, input symbols are spread over the entire transmission band in a frequency domain, a peak-to-average power ratio (PAPR) of a lastly transmitted signal decreases, and the required operation range of a transmitting amplifier of a mobile station can be reduced.

However, if transmission timing of a packet is adjusted and more particularly if packet transmission timing is advanced while a transmitting side continuously transmits packets by using the above modulation method two continuous packets may collide.

DISCLOSURE

Technical Problem

An object of the present invention is to provide a method of adjusting transmission timing at a transmitting side which is capable of preventing deterioration in reception performance and minimizing reception complexity when the transmitting side changes the transmission timing in a wireless communication that uses a cyclic prefix (CP) for preventing deterioration in reception performance due to delay spread or timing misalignment.

Another object of the present invention is to provide a method of continuously transmitting packets by using the method of adjusting the transmission timing.

A further object of the present invention is to provide a mobile station to which the method of transmitting the continuous packets is applied.

Technical Solution

The object of the present invention can be achieved by providing a method of adjusting transmission timing, the method including: adjusting the transmission timing according to a transmission timing adjustment command when the transmission timing adjustment command is received from a receiving side; and creating a cyclic prefix (CP) in consideration of a part of a CP of a next symbol which overlaps with a previous symbol on a time axis on the basis of the adjusted transmission timing.

The CP may be designed to have various lengths in consideration of channel conditions. For simplicity, the CP may be designed to have two different lengths, i.e., a normal CP and an extended CP. For example, in 3GPP LTE system using 20 MHz bandwidth, one symbol consists of 2048 samples and each symbol has duration of 66.67 us. In these configurations, the normal CP consists of 144 or 160 samples, whereby channel delay of 4.69 or 5.2 us can be covered. And, the extended CP consists of 512 samples, whereby channel delay of 16.67 us can be covered.

The adjusting of the transmission timing may include advancing start timing of a subframe transmitted by a mobile station while the mobile station continuously transmits packets.

In the creating of the CP, a part overlapping with the previous symbol may be removed from the CP extracted from data to be transmitted by the mobile station.

In the creating of the CP, the CP of the length, which is left by excluding a part overlapping with the previous symbol from a predetermined length, may be extracted from data to be transmitted by the mobile station.

In another aspect of the present invention, provided herein is a method of transmitting continuous packets, the method including: adjusting transmission timing according to a transmission timing adjustment command when the transmission timing adjustment command is received from a receiving side; creating a cyclic prefix (CP) in consideration of a part of a CP of a next symbol which overlaps with a previous symbol on a time axis on the basis of the adjusted transmission timing; and continuously transmitting a next symbol including the created CP.

The adjusting of the transmission timing may include advancing start timing of a subframe transmitted by a mobile station while the mobile station continuously transmits packets. In the creating of the CP, a part overlapping with the previous symbol may be removed from the CP extracted from data to be transmitted by the mobile station.

In the creating of the CP, the CP of the length, which is left by excluding a part overlapping with the previous symbol from a predetermined length, may be extracted from data to be transmitted by the mobile station.

In another aspect of the present invention, provided herein is a mobile station including: a cyclic prefix (CP) insertion unit creating a CP in consideration of a part of a CP of a next symbol which overlaps with a previous symbol on a time axis on the basis of the adjusted transmission timing when transmission timing is adjusted according to a transmission timing adjustment command while subframes are transmitted continuously; and a wireless communication unit continuously transmitting a next symbol including the created CP.

The CP insertion unit may remove a part overlapping with the previous symbol from the CP extracted from data transmitted by the mobile station and insert the CP into the next symbol. The CP insertion unit may extract a CP of the length, which is left by excluding the part overlapping with the previous symbol from a predetermined length, from the data to be transmitted by the mobile station and insert the extracted CP into the next symbol.

Advantageous Effects

According to the embodiments of the present invention, it is possible to prevent deterioration in reception performance and minimize reception complexity even when packet transmission timing is adjusted at a transmitting side using an OFDMA or analogous radio access scheme.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. However, the following embodiments of the present invention may be variously modified and the range of the present invention is not limited to the following embodiments.

Symbols described herein include OFDM symbols and SC-FDMA symbols. For convenience of description, the OFDM symbols will be described.

In uplink of a cellular mobile communication system using a multiplexing scheme such as an OFDMA or SC-FDMA scheme, OFDM symbols transmitted by different mobile stations in a cell at the same time are considered. The reception timings of the OFDM symbols at a base station should be equal within at least a CP length. In only this case, the base station can demodulate the OFDM symbols transmitted via different frequency bands by the different mobile stations at the same time without interference.

In addition, although it is assumed that only one mobile station exists within a cell, if an error occurs between periods of an oscillator in the mobile station used for creating an uplink transmission signal and an oscillator in the base station used for receiving the uplink signal, an error between a transmission signal creating timing of the mobile station and a reception timing of the base station may be increased with time.

Accordingly, the base station transmits transmission timing adjustment commands to the mobile stations within the cell periodically or when necessary. By this command, the base station can advance or delay the transmission timing of each mobile station by one or more predetermined steps. In addition, the base station adjusts reception timing of the signal that is transmitted by each mobile station.

The adjustment of the transmission timing is performed in the unit of packet transmission times constituted by a plurality of OFDM symbols, that is, in the unit of subframes. In other words, the adjustment of the transmission timing indicates an operation for advancing or delaying the subframe by one or more steps on a time axis.

Figure 1:
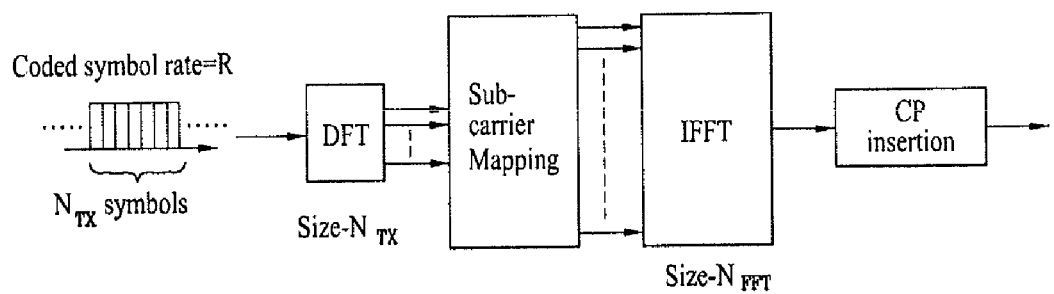
FIG. 1 is a view showing the structure of a transmitting side using a single carrier-frequency division multiple access (SC-FDMA) scheme.
Figure 2:
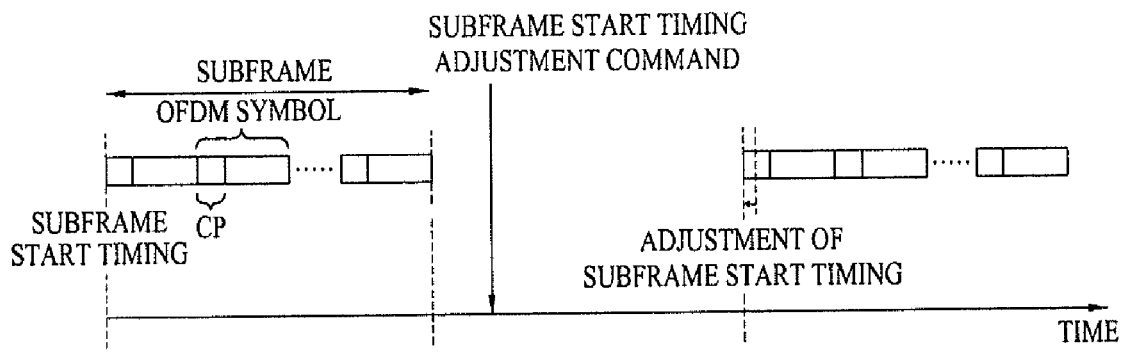
FIG. 2 is a view showing a process of adjusting transmission timing on a time axis at a transmitting side.

FIG. 2 is a view showing a process of adjusting transmission timing on a time axis at a transmitting side.

FIG. 2 shows an example when the transmitting side does not continuously transmit packets. If transmission timing adjustment command is received after the transmission of a series of subframes is completed, a subframe start timing is adjusted before the transmission of the subframe is newly started. In this case, collision between symbols does not occur.

Figure 3:
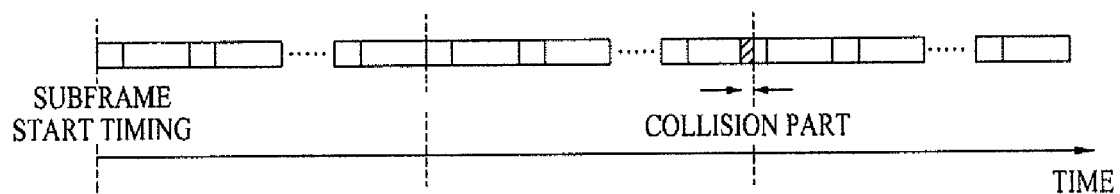
FIG. 3 is a view showing a process of adjusting transmission timing on a time axis while a transmitting side transmits packets continuously.

FIG. 3 is a view showing a process of adjusting transmission timing on a time axis while a transmitting side transmits continuous packets.

As shown in FIG. 3, when the transmission timing adjustment command received from the receiving side is applied while the transmitting side continuously transmits the packets and, more particularly, when the packet transmission timing is advanced, a part in which two continuous packets collide occurs. That is, a last OFDM symbol of a previous packet and a first OFDM symbol of a next packet overlap with each other for the adjustment of the transmission timing.

If the signals of the overlapped part are combined and transmitted together in order to avoid inter-symbol collision, interference occurs in a part in which the previous OFDM symbol and the next OFDM symbol overlap with each other and thus reception performance deteriorates.

Figure 4:
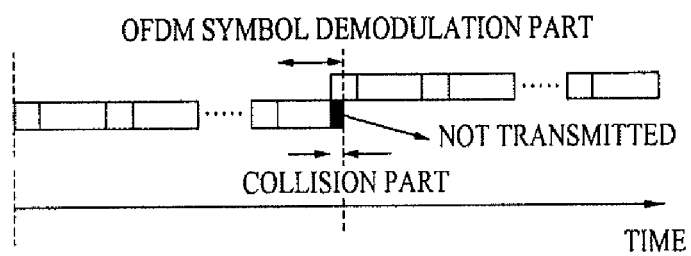
FIG. 4 is a view showing a case where a collision part of a previous symbol is not transmitted in order to avoid collision shown in FIG. 3.

FIG. 4 is a view showing a case where a part of a previous symbol in a collision part is not transmitted in order to avoid collision shown in FIG. 3.

In FIG. 4, the transmitting side does not transmit a signal of an overlapped part of a previous OFDM symbol. In this case, if the receiving side does not adjust the reception timing with respect to the previous OFDM symbol in advance, the overlapped part of the signal of the previous OFDM symbols is lost and thus the reception performance of the previous OFDM symbol deteriorates.

Accordingly, in the embodiments of the present invention, the signal corresponding to the overlapped part of a next OFDM symbol is not transmitted.

Figure 5:
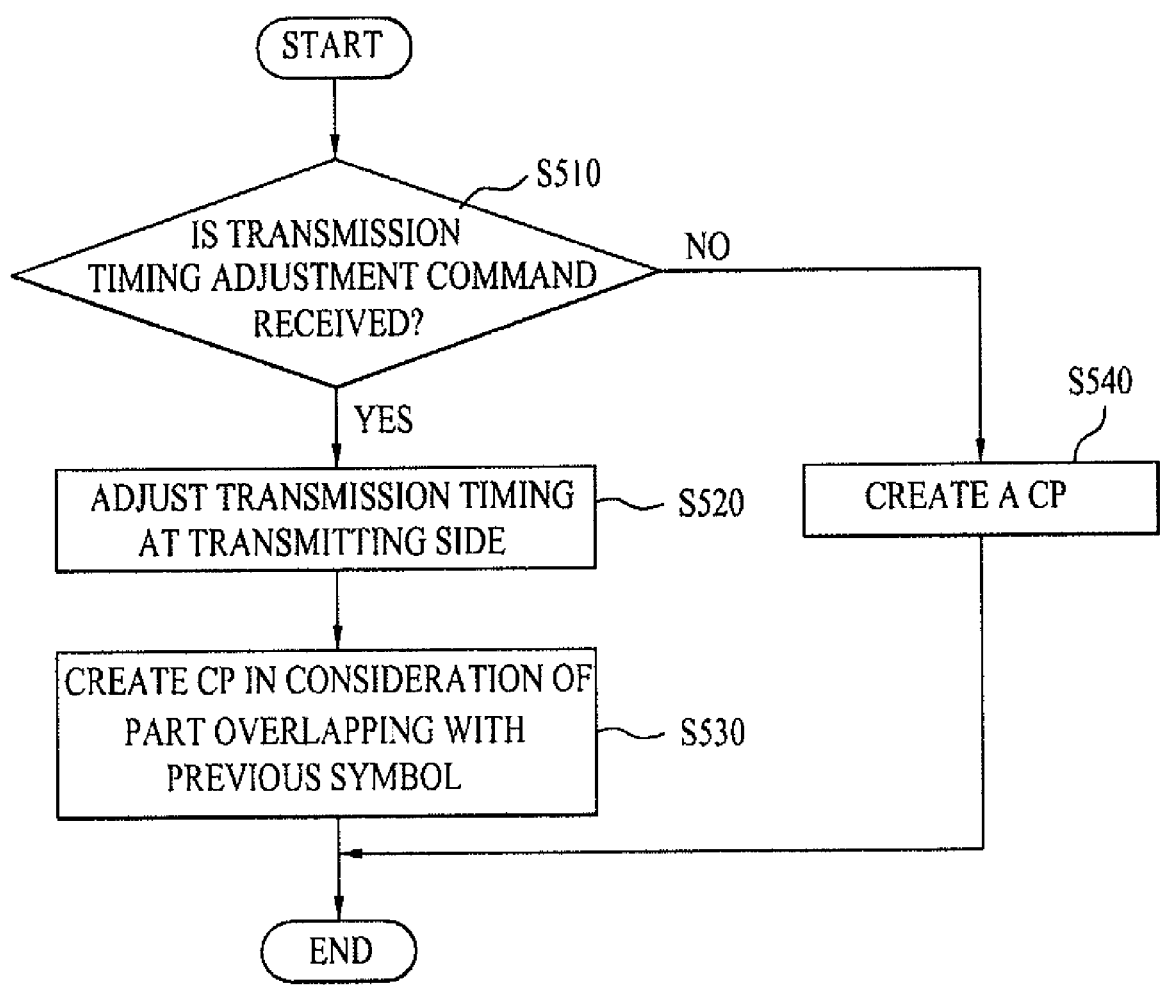
FIG. 5 is a flowchart illustrating a method of adjusting transmission timing according to an embodiment of the present invention.

FIG. 5 is a flowchart illustrating a method of adjusting transmission timing according to an embodiment of the present invention.

First, it is determined whether transmission timing adjustment command is received from a receiving side while packets are transmitted continuously (S510). At this time, if the transmission timing adjustment command is not received, a CP is created (S540). In this step, the created CP is a complete CP. The created CP may be a normal CP or an extended CP.

If the transmission timing adjustment command is received, transmission timing is adjusted according to the transmission timing adjustment command (S520).

Next, a CP is created in consideration of a part of a CP of a next symbol which overlaps with a previous symbol on a time axis on the basis of the transmission timing adjusted by the transmitting side (S530). The created CP is inserted into a foremost symbol of packets which will be continuously transmitted. Preferably, the CP may be created by a method of removing a part overlapping with the previous symbol from the CP extracted from data to be transmitted by a mobile station. Preferably, the CP may be created by a method of extracting a CP of the length, which is left by excluding a part overlapping with the previous symbol from a predetermined length, from data to be transmitted by the mobile station.

Figure 6:
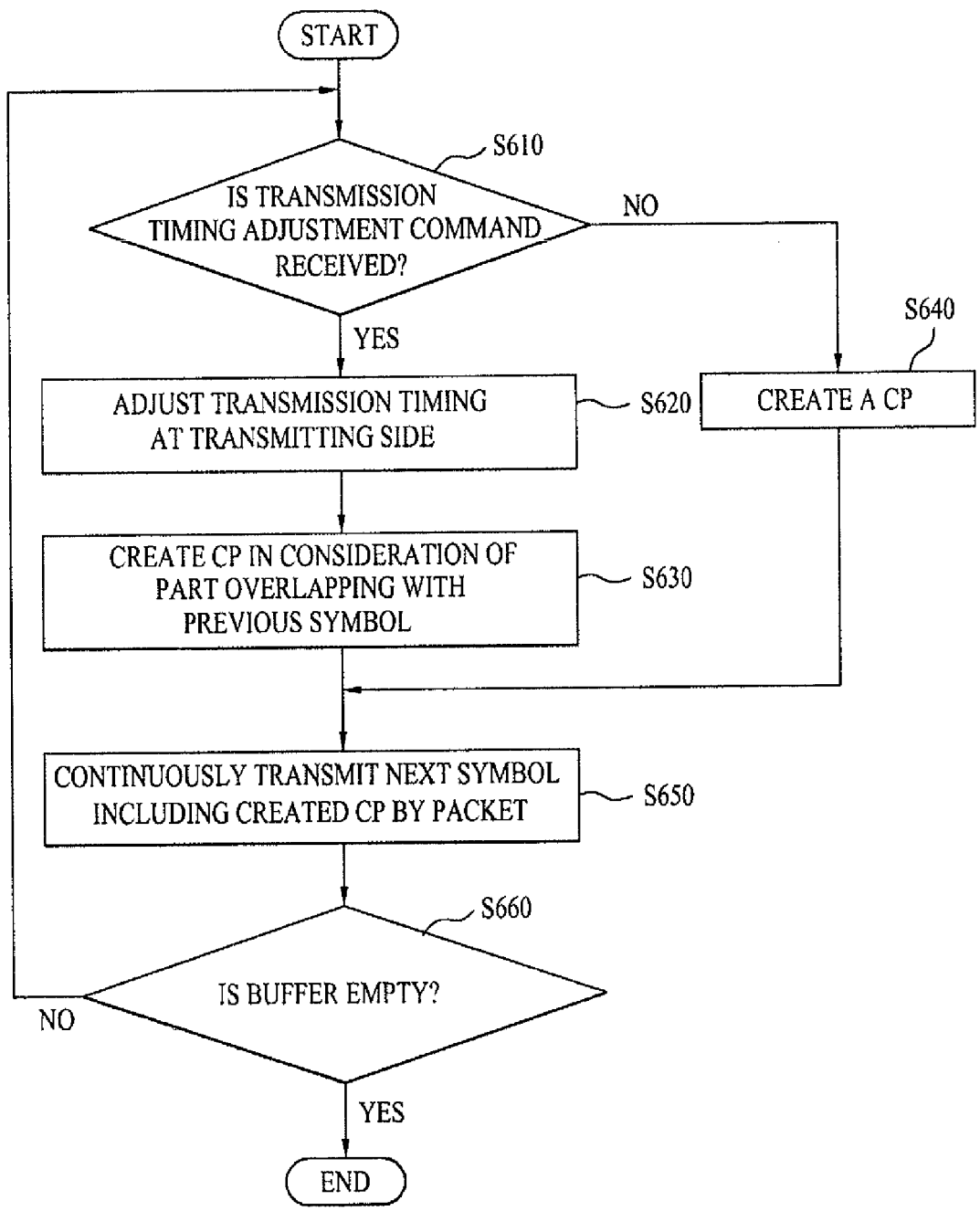
FIG. 6 is a flowchart illustrating a method of continuously transmitting packets according to an embodiment of the present invention.

FIG. 6 is a flowchart illustrating a method of continuously transmitting packets according to an embodiment of the present invention.

First, it is determined whether transmission timing adjustment command is received from a receiving side while packets are transmitted continuously (S610). At this time, if the transmission timing adjustment command is not received, a CP is created (S640). In this step, the created CP is a complete CP. The created CP may be a normal CP or an extended CP. The created CP is inserted into a foremost symbol of packets to be continuously transmitted.

If the transmission timing adjustment command is received from the receiving side, transmission timing is adjusted according to the transmission timing adjustment command (S620).

Next, a CP is created in consideration of a part of a CP of a next symbol which overlaps with a previous symbol on a time axis on the basis of the transmission timing adjusted by the transmitting side (S630). The created CP is inserted into a foremost symbol of packets to be continuously transmitted.

Next, the next symbol including the created CP is continuously transmitted to the receiving side by the packets (S650).

Finally, if a buffer in which data to be transmitted by a transmitting side is stored is empty, a packet transmitting process is completed and, if the buffer is not empty, it is determined whether the transmission command adjustment command is received while transmitting the packets continuously (S610).

Figure 7:
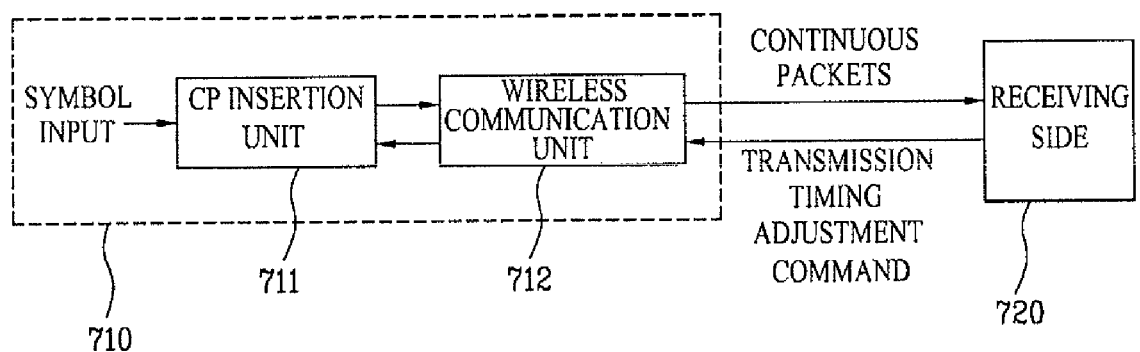
FIG. 7 is a view showing a transmitting side and a receiving side according to an embodiment of the present invention.

FIG. 7 is a view showing a transmitting side and a receiving side according to an embodiment of the present invention.

The transmitting side 710 includes a CP insertion unit 711 and a wireless communication unit 712. In addition, the transmitting side 710 may include a modulator and demodulator (not shown) for delivering the symbols, which are created by applying a modulation scheme such as an OFDMA scheme or a SC-FDMA scheme, to the CP insertion unit 711.

When the transmission timing is adjusted according to the transmission timing adjustment command while subframes are transmitted continuously, the CP insertion unit 711 creates a CP in consideration of a part of a CP of a next symbol which overlaps with a previous symbol on a time axis on the basis of the adjusted transmission timing. Preferably, the CP insertion unit 711 may remove the part overlapping with the previous symbol from the CP extracted from data to be transmitted by the transmitting side 710, and insert the CP into a next symbol. Preferably, the CP insertion unit 711 may extract a CP of the length, which is left by excluding the part overlapping with the previous symbol from a predetermined length, from the data to be transmitted by the transmitting side and insert the extracted CP into the next symbol.

The wireless communication unit 712 receives the transmission timing adjustment command from the receiving side 720. The wireless communication unit 712 continuously transmits the next symbol including the CP created by the CP insertion unit 711 to the receiving side 720.

Figure 8:
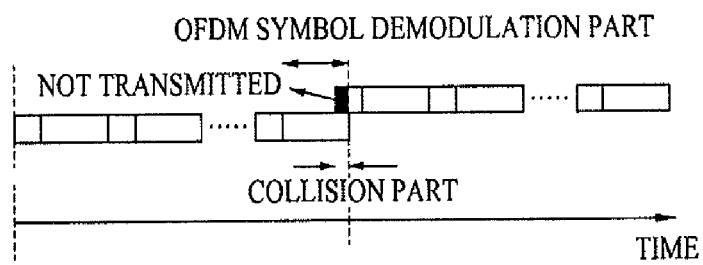
FIG. 8 is a view showing a process of continuously transmitting packets according to the method of FIG. 6.

FIG. 8 is a view showing a process of continuously transmitting packets according to the method of FIG. 6.

In FIG. 8, when the signal transmission parts of two packets overlap with each other by the adjustment of the transmission timing at the transmitting side, a signal of an overlapped part, including a CP, of a next packet in the two packets overlapping with each other on the time axis is not transmitted. At this time, if a part of a next OFDM symbol which overlaps with a previous OFDM symbol is included in a CP and the delay spread of a channel is not large, the previous OFDM symbol and the next OFDM symbol can be received without deterioration in reception performance.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing mainly on the data communication relationship between a mobile station and a Base Station (BS). Specific operations which have been described as being performed by the BS may also be performed by upper nodes as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "mobile station" may also be replaced with another term such as "user equipment (UE)", "terminal", or "mobile subscriber station (MSS)".

The embodiments of the present invention can be implemented by hardware, firmware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various the embodiments of the present invention may also be implemented in the form of software modules, processes, functions, or the like which perform the features or operations described above. Software code can be stored in a memory unit so that it can be executed by a processor. The memory unit may be located inside or outside the processor and can communicate data with the processor through a variety of known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a method of adjusting transmission timing at a transmitting side, which is capable of preventing deterioration in reception performance and minimizing reception complexity, a method of transmitting continuous packets, and a mobile station thereof. The present invention is applicable to a device used in an OFDMA and analogous radio accessing scheme, such as a mobile station or a base station, and a transmission/reception algorithm.

What is claimed is:

1. A method of transmitting, by user equipment (UE), a subframe including a plurality of symbols in a cellular mobile communication system, the method comprising:
   receiving by the UE a timing adjustment command for indicating an advance of a transmission timing of the subframe relative to a current transmission timing;
   determining by the UE whether a previous subframe to which the current transmission timing is applied overlaps at least a front part of the subframe; and
   when the previous subframe is determined to overlap at least the front part of the subframe, transmitting by the UE the subframe beginning with a part of the subframe next to the overlapped part of the subframe.

2. The method of claim 1, wherein the timing adjustment command indicates the advance of the transmission timing of the subframe in accordance with a predetermined step size relative to the current transmission timing.

3. The method of claim 1, the overlapped part of the subframe is shorter than a cyclic prefix of the subframe.

4. The method of claim 1, the overlapped part of the subframe includes a cyclic prefix of the subframe.

5. The method of claim 1, the overlapped part of the subframe includes one or more symbols of the subframe.

6. The method of claim 1, wherein the plurality of symbols include Orthogonal Frequency Division Multiplexing (OFDM) symbols.

7. The method of claim 1, wherein the plurality of symbols include Single Carrier-Frequency Division Multiple Access (SC-FDMA) symbols.

8. A user equipment configured to perform communication in a cellular mobile communication system by using a subframe including a plurality of symbols, the user equipment comprising:
   a wireless communication unit configured to receive a timing adjustment command for indicating an advance of a transmission timing of the subframe relative to a current transmission timing and to transmit the subframe according to a given transmission timing; and
   a subframe generating unit configured to generate the subframe and to determine whether a previous subframe to which the current transmission timing is applied overlaps at least a front part of the subframe,
   wherein when the previous subframe is determined to overlap at least the front part of the subframe, the wireless communication unit is configured to transmit the subframe beginning with a part of the subframe next to the overlapped part of the subframe.

9. The user equipment of claim 8, wherein the timing adjustment command indicates the advance of the transmission timing of the subframe in accordance with a predetermined step size relative to the current transmission timing.

10. The user equipment of claim 8, the overlapped part of the subframe is shorter than a cyclic prefix of the subframe.

11. The user equipment of claim 8, the overlapped part of the subframe includes a cyclic prefix of the subframe.

12. The user equipment of claim 8, the overlapped part of the subframe includes one or more symbols of the subframe.

13. The user equipment of claim 8, wherein the plurality of symbols are Orthogonal Frequency Division Multiplexing (OFDM) symbols.

14. The user equipment of claim 8, wherein the plurality of symbols are Single Carrier-Frequency Division Multiple Access (SC-FDMA) symbols.

15. The method of claim 1, when the previous subframe overlaps the subframe, the previous subframe is transmitted as a whole.

16. The user equipment of claim 8, when the previous subframe overlaps the subframe, the previous subframe is transmitted as a whole.

* * * * *